United States Patent [19]

Stevens

[11] Patent Number: 4,706,990
[45] Date of Patent: Nov. 17, 1987

[54] MECHANICAL IMPACT SENSOR FOR AUTOMOTIVE CRASH BAG SYSTEMS

[75] Inventor: George L. Stevens, N. Ogden, Utah
[73] Assignee: Morton Thiokol, Inc., Chicago, Ill.
[21] Appl. No.: 835,084
[22] Filed: Feb. 28, 1986
[51] Int. Cl.$^4$ ............................................. B60R 21/08
[52] U.S. Cl. ..................................... 280/734; 280/728
[58] Field of Search ................ 280/728, 731, 732, 734

[56] References Cited

U.S. PATENT DOCUMENTS

| | | | |
|---|---|---|---|
| 3,552,769 | 1/1971 | Kemmerer et al. | 280/734 |
| 3,922,002 | 11/1975 | Lindbert et al. | 280/734 |
| 4,258,931 | 3/1981 | Lee et al. | 280/734 |
| 4,272,102 | 6/1981 | Burkdoll | 280/734 |
| 4,552,380 | 11/1985 | Stevens | 280/734 |

Primary Examiner—Richard A. Bertsch
Attorney, Agent, or Firm—Gerald K. White

[57] ABSTRACT

An impact sensor for a vehicle crash restraint system features mounting thereof in a region behind the vehicle bumper area which first experiences the effect of a crash and the utilization of both the energy of an over-center spring and the inertial force of a decelerating mass for the generation of energy in a firing pin to initiate an explosive primer thereby to provide a faster reaction to a crash, which reaction is rapidly transmitted by a pyrotechnic transmission line to an inflator located in the vehicle passenger compartment for inflating an inflatable crash bag.

1 Claim, 4 Drawing Figures

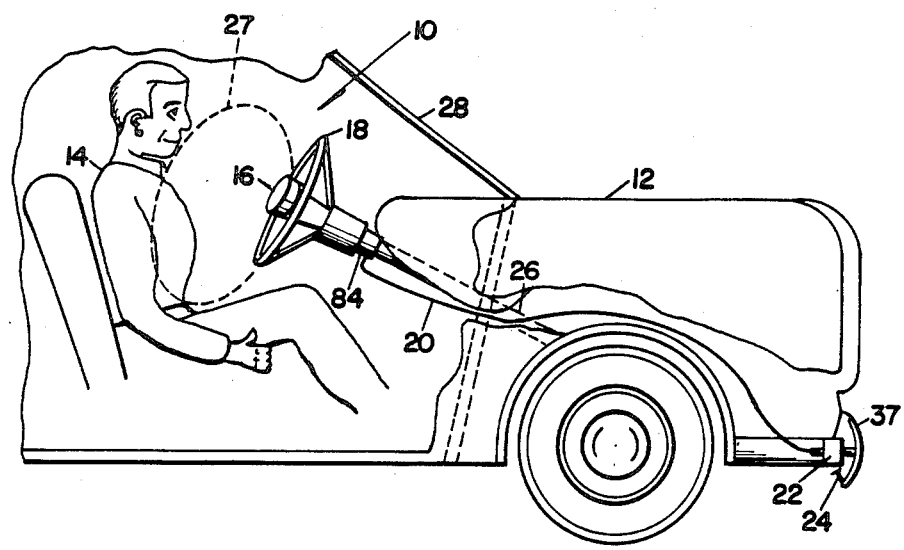
Fig. 1
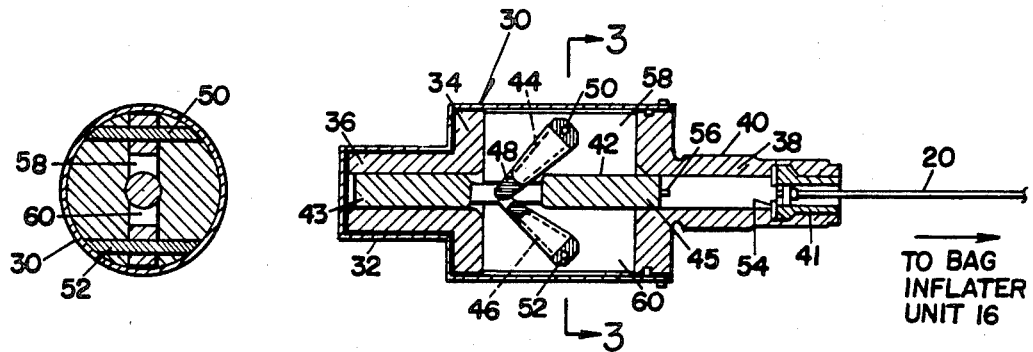
Fig. 3
← ACCELERATION
Fig. 2
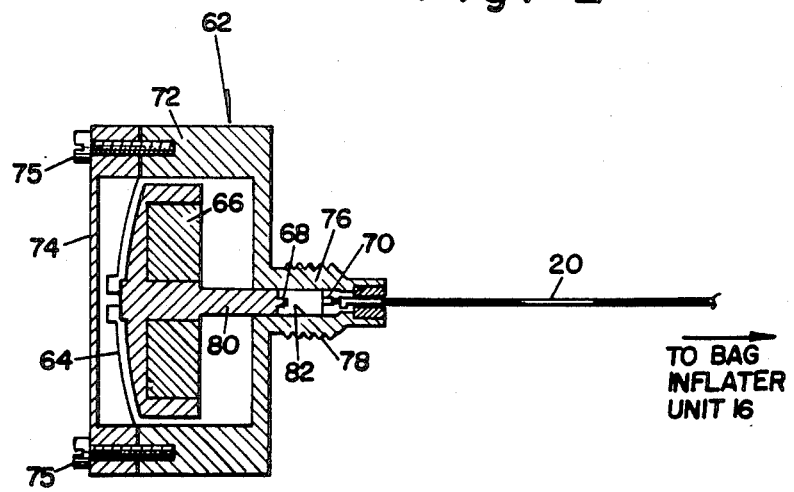
Fig. 4

MECHANICAL IMPACT SENSOR FOR AUTOMOTIVE CRASH BAG SYSTEMS

BACKGROUND OF THE INVENTION

1. Field of the Invention

The present invention relates to an improvement in inertial impact sensors having particular utility in automotive vehicle inflatable air bag restraint systems. The sensor senses an impact and actuates a gas generator to inflate an air bag for restraining forward movement of seated occupants during the critical instant of collision impact.

2. Description of the Prior Art

Realizing that automotive vehicle crash restraint systems requiring positive effort on the part of the user for effectiveness have largely been ignored by the population intended to be protected, governmental safety programs have tended to emphasize automatic restraint systems, such as gas or air bags.

A gas filled bag has been demonstrated to be an effective device for protecting automotive occupants during crashes. The details of crash bag systems have been widely discussed, as have the reasons for selection of pyrotechnic devices when dependable gas supplies for the rapid deployment of crash bags are required. The operational constraints of crash bags are also well known. The system must supply non-toxic gas to inflate the bag because the bag generally is vented into the interior of the vehicle on deflation and because of the possibility of rupture in an actual crash situation. The gas must inflate the bag at a temperature which the vehicle occupants to be protected can tolerate. The time period for attainment of maximum inflation has been determined to be from 20 to 100 milliseconds after actuation by an impact sensor.

An impact sensor senses an impact and actuates a gas generator to inflate a crash bag located between the vehicle front seat occupants and the windshield-dashboard area. As noted above, the time to accomplish this operation is very short. Assuming a head-on collision of an automobile travelling 60 miles per hour (88 feet per second) with a stationary barrier, an inelastic impact would result in the occupants moving forward twelve inches in approximately the first 10 milliseconds after initial contact. Since some elasticity is present in the crushing of metallic structure, the time between the first structural contact and the movement of the vehicle occupants is of the order of 30 milliseconds. The system must function and the bag must be deployed in this time period in order to be effective.

Impact sensors located directly behind the front bumper of the vehicle are in a region which will experience the first effects of a crash and thus allow a maximum time for operation. Several impact sensors may be strategically placed in this area to accommodate the various impact modes that are possible.

The apparatus components comprising the system must be safe to handle and store prior to installation. Such components also must be adaptable to mass production, lend themselves to easy installation, and not introduce an unreasonable hazard at the time of installation or during the life of the vehicle. Additionally, the system must assure reliable operation during the life of the vehicle, which may be 10 years or more.

Sensors which utilize inertial forces to cause a firing pin to impact an explosive primer are known in the prior art. Thus, in U.S. Pat. No. 2,324,243, granted on July 13, 1943 to L. S. Serog, there is disclosed a sensor for causing the detonation of a projectile upon impact. The Serog sensor involves the compression of a spring using the inertial forces of impact, and then release of the spring and the firing pin by means of a latching arrangement.

U.S. Pat. No. 2,857,842 granted on Oct. 28, 1958 to K. O. Malm discloses a sensing device for a land mine comprising an overcenter belleville spring which, when mechanically triggered, activates a firing pin to initiate an explosive primer.

U.S. Pat. No. 3,552,769, granted to R. M. Kemmerer et al on Jan. 5, 1971, discloses a sensor that is mounted behind the front bumper of a vehicle and which utilizes the inertial forces of impact to actuate a gas generator to effect the deployment of a crash bag. The Kemmerer et al arrangement consists of compressing a spring using the inertial forces of impact and then releasing the spring and a firing pin with a ball-detent latch.

In U.S. Pat. No. 4,167,276, granted on Sept. 11, 1979 to L. E. Bell et al, an impact sensing device for actuating the inflating unit of a vehicle air bag restraint system is mounted adjacent the inflating unit on the steering wheel of the vehicle. The impact sensing device includes an inertial mass, a ball, that is pulled off a magnet by the impact force. The inertial mass then strikes a lever which releases a firing pin which has been preloaded with a spring to impact an explosive primer.

Each of the above prior art sensors for activating a firing pin to initiate an explosive primer is characterized in that the only source of energy propelling the firing pin to impact the explosive primer is the associated spring. That is to say, in each of the Serog, Kemmerer et al and Bell et al patents the inertial forces of an inertial mass are utilized only to trigger the release of the firing pin for actuation by a spring. No inertial forces are involved in the Malm patent, the triggering for the release of the spring being mechanical as when treaded upon or actuated by a car or the like rolling over the land mine.

An impact sensing device that utilizes both a spring and the inertial force of a decelerating mass to generate the energy to initiate an explosive primer is disclosed in my U.S. Pat. No. 4,552,380 granted on Nov. 12, 1985 and assigned to Morton Thiokol, Inc., the assignee of the present invention and application. The impact sensing device there disclosed includes an over-center spring arrangement that allows the energy of the inertial force in addition to that of the spring arrangement to be applied to a firing pin for impacting an explosive primer. As in the aforementioned Bell et al patent, however, the impact sensing device is mounted adjacent the inflating unit on the steering wheel of the vehicle.

While mounting the impact sensing device adjacent the inflating unit on the steering wheel of the vehicle allows the vehicle restraint system to be self-contained, the impact sensing device, as above mentioned, is not then in a region which will experience the first effects of a crash. As a result, there is a delay in the reaction to the crash and a corresponding reduction in the amount of time allowed for operation of the rest of the system.

There is thus a need and a demand for further improvement in impact sensor arrangements for automotive crash bag systems. The present invention was devised to fill this technological gap.

SUMMARY OF THE INVENTION

An object of the invention is to provide an improvement in impact sensing arrangements for use in vehicle restraint systems that enables faster reaction to a crash.

Another object of the invention is to provide such an improved impact sensing arrangement in which the sensor is mounted on a forward portion of the vehicle such as behind the front bumper and utilizes both the forces of inertia and of a spring to propel a firing pin to impact an explosive primer responsively to a crash.

A further object of the invention is to provide such an improved impact sensor that is both adaptable to mass production and easy to install, and additionally, that introduces no unreasonable hazards at the time of installation and is reliable during the life of the vehicle.

In accomplishing these and other objectives of the invention, the impact sensor is located directly behind the front bumper of the vehicle in a region which will experience the first effects of a crash. In one embodiment, the impact sensor comprises an inertial mass that is restrained away from a percussion primer by over-center springs. When a predetermined acceleration level is reached, the mass moves against the spring force until the over-center position is reached, at which time the energy stored in the springs assists the inertial force of the mass in driving a firing pin against a percussion primer to initiate the latter. The impact sensor of this embodiment thus acts as an integrating accelerometer, since the acceleration of the mass must act through a finite distance before the initiation is effected. Thus, the sensor is insensitive to inadvertent initiation from short duration, high acceleration shocks which might be caused by careless mechanics, vandals, or flying objects striking it.

In a second embodiment, a thin concave steel diaphragm is used instead of over-center springs. "Oil-canning" action of this diaphragm acts to restrain an inertial mass until an acceleration level is reached that is high enough to produce a force sufficient to buckle the diaphragm. When the diaphragm buckles, the "over-center" action causes the diaphragm to assist the inertial load to cause a firing pin to strike a percussion primer, thus initiating it.

In each of the embodiments, the percussion primer initiates a detonation train consisting of an acceleration charge of lead oxide and a base charge of PETN or RDX. This provides a high order detonation output to reliably initiate a Mild Detonating Fuse (MDF) to transfer the stimulus to a gas generator located on the steering wheel or dashboard in the interior of the vehicle. An alternate material that may be used to transfer the initiation stimulus from the impact sensor to the gas generator is a Thin Layer Explosive Line (TLX).

MDF has a propagation rate of approximately 21,000 feet per second and TLX has a rate of 6000 feet per second, resulting in a propagation time through a 9 foot line of about 0.5 and 1.5 milliseconds, respectively.

The MDF or TLX transfer lines initiate an ignition material such as Hivelite or ITLX which, in turn, ignite the propellant in the crash bag inflator. "Hivelite" is a pyrotechnic material manufactured by McCormick Selph Associates, Hollister, Calif. "ITLX" is an ignition material manufactured by Explosive Technology, Fairfield, Calif.

The various features of novelty which characterize the invention are pointed out with particularlity in the claim annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specification, of which:

FIG. 1 is a schematic illustration of a vehicle having a pyrotechnic air bag restraint system arranged in accordance with the present invention for protecting a driver of the vehicle during an accident;

FIG. 2 is a cross sectional view of the crash impact sensing device of FIG. 1 constructed in accordance with a first embodiment of the invention;

FIG. 3 is a cross sectional view taken along the lines 3—3 of FIG. 2; and

FIG. 4 is a cross sectional view of the crash impact sensing device of FIG. 1 constructed in accordance with a second embodiment of the invention.

DESCRIPTION OF THE PREFERRED EMBODIMENTS

While the present invention can be used to protect occupants of many different types of vehicles including trucks, aircraft and boats, a safety restraint system 10 constructed in accordance with the invention is illustrated in FIG. 1 as installed in an automobile 12. The restraint system 10 is arranged to protect a driver 14 of the autombile and includes a pyrotechnic air bag inflating unit or inflator 16 mounted on the steering wheel 18 of the automobile 12. The restraint system 10 further includes an actuating pyrotechnic transmission line 20 that extends from an impact sensor 22 that is located at a forward external portion 24 of the automobile 12 into the passenger compartment and through an upper portion of the cylindrical steering column 26 for operating the safety restraint system 10 responsively to a collision.

Operation of the restraint system 10 results in an air bag being expanded from a collapsed condition (not shown in the drawings) to an expanded or operative condition indicated by dashed lines 27 in FIG. 1. In the expanded condition the air bag 27 restrains forward movement of the driver 14 relatively to the steering wheel 18, and a windshield 28 thereby to protect the driver 14 during a collision.

The inflator 16 may be of known type, a preferred type being the light weight inflator disclosed and claimed in U.S. Pat. No. 4,547,342 granted on Oct. 15, 1985 to Gary V. Adams et al. The pyrotechnic transmission line 20 also may be of known type, a preferred type being that disclosed in application for U.S. patent bearing Ser. No. 751,345, filed on July 2, 1985 by Gary V. Adams et al. The disclosures of U.S. Pat. No. 4,547,342 and application Ser. No. 751,345, by reference, are incorporated herein.

The impact sensor 22 according to a first embodiment of the invention is illustrated in FIGS. 2 and 3. As there shown, the impact sensor 22 comprises a cylindrical steel case or cover 30 having a closed cylindrical portion 32 of reduced diameter at one end.

Positioned within case 30 and suitably retained therein is a tube 34 made of a suitable metal. One end 36 of tube 32 extends into the closed portion 32 of case 30. The other end 38 of tube 34 projects from case 30 and is provided with a mounting thread 40. The end 38 of tube 34 is retained in a tapped hole in a suitable structural body member of the automobile 12 immediately behind the front bumper. A fitting 41 is provided in a tapped hole in the end 38 for attaching one end of the pyrotechnic transmission line 20 to the sensor 22.

Contained within tube 34 and suitably positioned therein for endwise sliding movement is an elongated inertial cylindrical mass 42 having a first end 43 and a second end 45. Mass 42 is biased toward the left end of case 30, as seen in FIG. 2, by a pair of over-center helical springs 44 and 46. In this biased position, the first end 43 of mass 42 extends fully into the end 36 of tube 34. Mass 42 is then at one extreme of its range of sliding movement, being substantially fully inserted into that end of tube 34 that is located within the closed portion 32 of case 30. Thus, the inertial mass 42 is slidably arranged in tube 34 for movement from the end 36 thereof to the end 38, which ends, for convenience, are referred to hereinafter as first and second ends, respectively, of case 30.

One end of each of springs 44 and 46 is pivotally attached to the mass 42 by a shaft 48 that is suitably carried by mass 42 at a position substantially intermediate the length thereof. The other ends of springs 44 and 46 are carried by shafts 50 and 52, respectively, that are suitably retained within tube 34.

For activating the pyrotechnic transmission line 20, a percussion primer 54 is provided in the second end 38 of tube 34, being suitably positioned therein, and a firing pin 56 is provided on the associated second end of the inertial mass 42. The firing pin 56 desirably may be made of high density depleted uranium in order to maximize the energy imparted to the primer 54 during a crash. While a firing pin 56 made of steel should be adequate, the higher the mass the better. Normally, the firing pin 56 is held out of engagement with the primer 54 by the over-center helical springs 44 and 46 which extend in opposite directions from the firing pin 56 into opposed substantially rectangular regions 58 and 60, respectively, within tube 34.

Operation and use of the invention is described assuming an impact sensor 22 as disclosed and described in connection with FIGS. 2 and 3 is installed in a pyrotechnic air bag system as described with reference to FIG. 1. When a predetermined acceleration level is reached, the inertial mass 42 moves against the force of the helical springs 44 and 46 until the over-center position is reached. The helical springs 44 and 46 then assist the inertial force acting on the inertial mass 42 and the firing pin 56, thereby to augment the energy acting on the firing pin 56 as it strikes the primer 54.

Initiation of primer 54 produces an ignitive reaction or detonating shock wave which is propagated through the pyrotechnic transmission line 20 to the igniter of the inflator 16. The air bag is rapidly inflated by the inflator 16.

In a second embodiment of the invention, an impact sensor 62, as illustrated in FIG. 4 is utilized. A thin over-center concave steel diaphragm 64 is used in sensor 62 instead of the two over-center helical springs 44 and 46 of sensor 22. The "oil canning" action of the diaphragm 64 acts to restrain an inertial mass 66 until an acceleration level is reached that is high enough to produce a force sufficient to buckle the diaphragm 64. When the diaphragm buckles, the over-center action causes the diaphragm 64 to assist the inertial force to cause a firing pin 68 carried by inertial mass 66 to strike a percussion primer 70, thus initiating it. As in the embodiment of FIGS. 2 and 3, the initiation of the percussion primer 70 produces an ignitive reaction or detonating shock wave through the pyrotechnic transmission line 20 to the igniter of the inflator 22. This results in rapid inflation of the air bag.

As shown in FIG. 4, the diaphragm 64, inertial mass 66, firing pin 68 and primer 70 are all contained within a cylindrical casing 72. Casing 72 has a removable cap 74 at one end. Cap 74 is retained on the end of casing 72 by suitable screws 75. The other end 76 of casing 72, which end is integral with casing 72, has a reduced cross section and is provided with a mounting thread 78 thereon.

Diaphragm 64 is fixedly attached to casing 72 by being retained at its peripheral edges between the cap 74 and the end of case 72. The interial mass 66 is suitably attached at a central location thereof to a central location on the diaphragm 64. The firing pin 68 is carried on the end of an extension member or rod 80 that is integral with the mass 66, the rod 80 being slidably positioned within a bore 82 in the end 76 of casing 72.

The percussion primers 54 and 70 of the impact sensors 22 and 62 may consist of a charge of lead azide and a base charge of PETN or RDX. Such a charge provides a high order detonation output to reliably initiate the pyrotechnic transmission line 20. Line 20 may comprise a Mild Detonating Fuse or a Thin Layer Explosive Line, as described hereinbefore, for transferring the stimulus to the inflator 16.

As illustrated in FIG. 1, the transmission line 20 extends from the impact sensor, sensor 22 of the first embodiment of the invention or sensor 62 of the second embodiment, to a slip joint 84 that is mounted on the cylindrical steering column 26 of the automobile 12. The slip joint 84 provides communication between the relatively stationary end of transmission line 20 and ignition material such as Hivelite or ITLX, as previously described, which, in turn, ignite the propellant in the air bag inflator.

The detailed construction of the above-mentioned slip joint arrangement for providing communication between the transmission line 20 and the inflator 16 for protecting the driver of an automobile is disclosed and claimed in the aforementioned copending application of Adams et al bearing Ser. No. 751,345 and per se forms no part of the invention. Therefore, that construction will not further be described herein. It is noted, however, that the present invention has utility for the rapid deployment of air bag safety apparatus provided for the protection of occupants other than the driver and, in particular, the front seat passengers. A pyrotechnic transmission line enabling such protection is also disclosed and claimed in application Ser. No. 751,345.

It will be understood that, if desired, the slip joint may be omitted and the adjacent end of pyrotechnic transmission line 20 may be directly connected in a suitable manner to the inflating unit 16 for deploying the air bag responsively to a crash.

Thus, there has been provided, in accordance with the invention, an improvement in impact sensing arrangements for use in vehicle safety apparatus wherein the impact sensor is mounted in a location or region of the vehicle which will experience the first effects of a crash, thus allowing maximum time for operation of the rest of the system, and wherein both a spring force and the inertial force of a decelerating mass are utilized to generate energy in a firing pin to initiate an explosive primer. With this impact sensor arrangement there results a faster reaction to a crash and a reaction that is rapidly transmitted by the pyrotechnic transmission line 20 to inflator 16 for deploying the air bag as rapidly as possible to its expanded condition responsively to the crash.

With this description of the invention in detail, those skilled in the art will appreciate that modifications may be made to the invention without departing from its spirit. Therefore, it is not intended that the scope of the invention be limited to the specific embodiments illustrated and described. Rather, it is intended that the scope of this invention be determined by the appended claim and its equivalents.

What is claimed is:

1. An impact sensor for an automotive crash bag system for detecting the occurrence of a crash comprising, a cylindrical casing having a first end and a second end, said casing including a hollow threaded mounting member at said second end and having a removable cap closing the first end, said threaded mounting member having a tapped hole therein, a percussion primer contained within said casing at said second end thereof, said percussion primer being mounted within said mounting member, an inertial mass slidably arranged in said casing for movement from said first end to said second end, said inertial mass having a first end and a second end with said first end thereof facing the first end of said casing, a firing pin attached to the second end of said inertial mass, over-center spring means connected between said casing and said inertial mass and operative normally to bias said inertial mass to the first end of said casing thereby to hold said firing pin out of engagement with said percussion primer, said over-center spring means comprising an over-center concave diaphragm that is retained at the peripheral edges thereof between the first end of said casing and said removable cap, said inertial mass being attached to said diaphragm at a central location thereof and including an integral rod extending into said threaded mounting member with said firing pin attached to the end of said rod in facing relation to said percussion primer, oil canning action of said diaphragm acting to restrain said inertial mass until a predetermined acceleration level is reached that is high enough to produce a force sufficient to buckle said diaphragm, and upon buckling, over-center action causing said diaphragm to assist the inertial force to cause said firing pin to strike said percussion primer to produce a detonating shock wave, and a fitting for the attachment of a pyrotechnic transmission line mounted in said tapped hole in said threaded mounting member.

* * * * *